Sept. 17, 1940. J. R. WORMLEY 2,215,202
DIESEL ENGINE
Filed March 1, 1939 6 Sheets-Sheet 1

Sept. 17, 1940.                J. R. WORMLEY                  2,215,202
                                DIESEL ENGINE
                           Filed March 1, 1939          6 Sheets-Sheet 3

Fig. 3.

Inventor:
Jonathan R. Wormley
By David Manly Heller
Attorney.

Sept. 17, 1940.  J. R. WORMLEY  2,215,202
DIESEL ENGINE
Filed March 1, 1939  6 Sheets-Sheet 4

Fig. 4.

Inventor:
Jonathan R. Wormley,
By David Manly Helm
Attorney.

Patented Sept. 17, 1940

2,215,202

UNITED STATES PATENT OFFICE 2,215,202

DIESEL ENGINE

Jonathan R. Wormley, Ransom, Ill.

Application March 1, 1939, Serial No. 259,208

20 Claims. (Cl. 123—54)

This invention relates to Diesel type engines, the main and primary object of the invention being the provision of a light weight high speed engine design eliminating the need for valves, gearing, and injector pumps used in present Diesel construction. In view of the fact that injector pumps are difficult to repair and expensive to manufacture, and since they are, at best inefficient for providing a perfect fuel mixture when the engine runs idle or at 2500 to 3000 R. P. M. I feel that my Diesel design, eliminating such pumps provides an ideally efficient structure.

An important object of the invention is also the provision of pre-compression chambers within each cylinder where the fuel mixture is pre-compressed to a point which will facilitate combustion; the final compression taking place in the actual cylinder head where combustion takes place.

Another important object of the invention is to provide a carburetor in order to supply a perfect air and fuel mixture so rich that it will not burn in the pre-combustion chamber, which I provide in my Diesel engine structure, and not until it comes in contact with air under final compression, which occurs during the engine cycle, with the advantage of furnishing new and better results. In the present type of Diesel design the air and fuel mixture must be injected at a pressure between 700 to 800 lbs.

Another object of the invention is to provide two air pump cylinders that are operated under low pressure, and provide the necessary air pressure for scavenging the cylinders after combustion has taken place. By virtue of operating these scavenging cylinders at low pressure, I make sure that no burnt gases are left within the combustion chambers which should in itself increase considerably, the efficiency of operation of my Diesel engine design.

Another and further object of my invention is to provide a three link drive connection between the crank shaft and the pistons, which arrangement proves advantageous in that it furnishes a toggle method of operating the pistons in their forward and backward reciprocating movement, thus helping to relieve the strain to which the wrist pins and crank-shaft are usually subjected. This permits the design of the body of the engine to assume a rather light and durable construction, since it does not have to withstand any extreme stresses at any point; inasmuch as this construction provides a distribution of strains and stresses normally occurring in Diesel engine construction.

A Diesel engine normally operated under high compression, combustion taking place by virtue of high compression, necessarily requires that the component parts or elements, as well as the main body structure be made very rigid and substantial both in weight and thickness to withstand the strains and stresses under such normal operations.

It is my contention that the three link toggle transmission arrangement which I provide also materially aids in carrying over the crank-shaft during its rotary motion, over the diametrally opposed "dead center" positions and in that way the power stroke of my cylinders is immeasurably advanced, and more efficient than the present type of Diesel engine construction.

Another object of the invention is the arrangement of combustion heads in one cylinder diametrically opposed to the combustion head in any adjacent cylinder, which in combination with the three link toggle action, provides smooth and uniform operation especially over the crank-shaft "dead center" points.

A further object of the invention is providing a pre-compression chamber which is mechanically and positively controlled.

Another feature of the invention is providing a cam actuating means in connection with the mechanical operation of the pre-compression chamber, which cam arrangement has slotted means for setting and timing the positive action and operation of the pre-compression head.

Another object of my invention is the provision of means for whirling or spinning the mixture of air and fuel prior to combustion, in order to obtain a thorough mixture so essential and ideal for perfect combustion.

Because of the advantages so far enumerated and especially because of the pre-compression arrangement that I have provided in my type of engine design, it is possible to attain the most efficient results. Because of these features, my design will operate on a lower compression, and hence will offset the intense strains and stresses to which certain portions of the present Diesel engine design are subjected, and which make it imperative that present Diesel engine construction be rather weighty, heavy, and bulky, in order to provide the necessary strength needed to withstand the stresses and strains created by high compression requirements.

Because of my scavenging pump cylinders being located intermediately and transversely of the main cylinder structure, it permits my Diesel engine body, or support for tieing up the different units to be made of rather light and durable material such as duralumin cast integrally with the cylinders and lined with sleeves of cast iron or other suitable bearing material for the piston working surfaces, thus providing extreme lightness in weight.

Inasmuch as this construction lends itself to such structural arrangement being used it makes for a light, durable and practical construction, simple in operation, and cheap and economical to manufacture in quantity production.

Other features may reside in the invention, which may come to light from the following description.

The foregoing and other features may become apparent to those skilled in the art by reference to the drawings wherein like symbols designate like parts and in which.

Figures 1, 5:
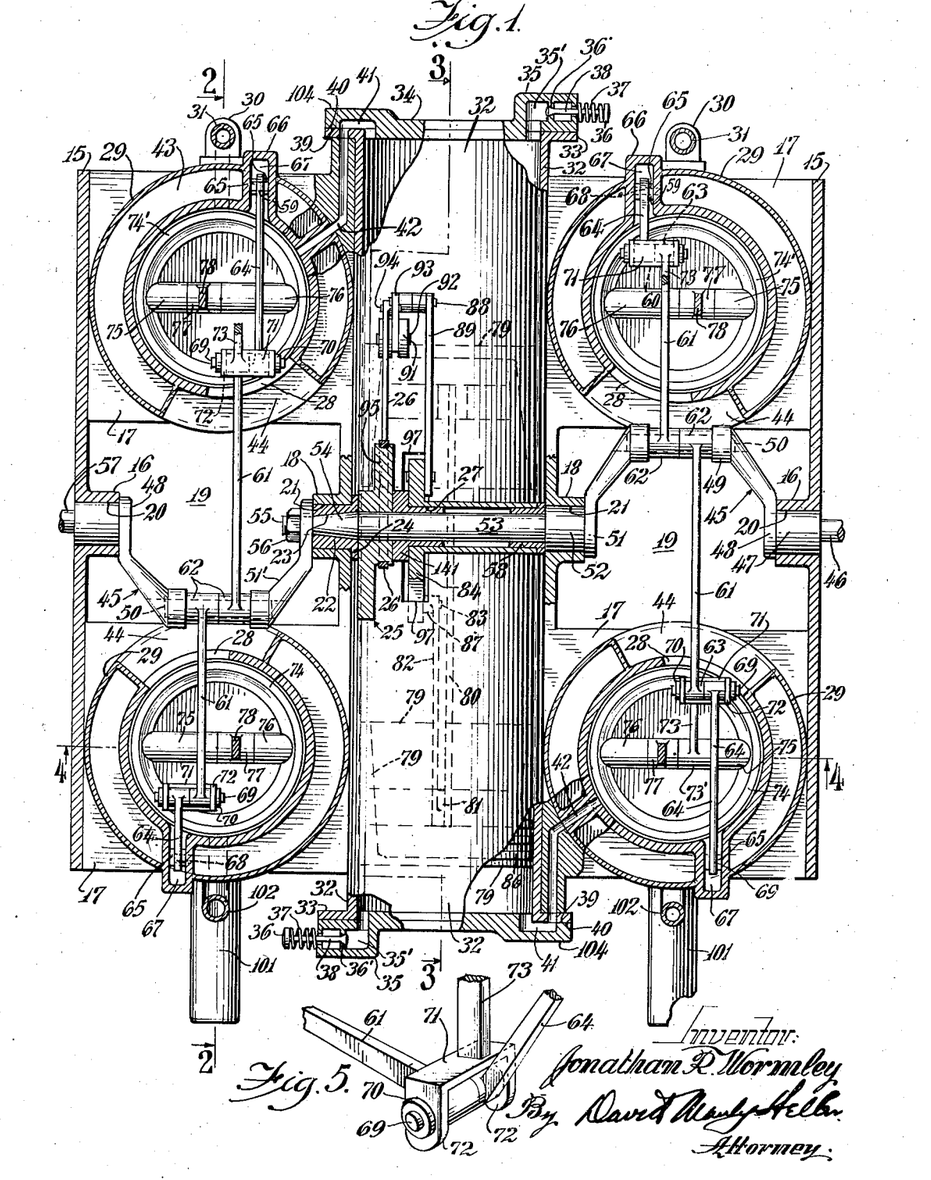
Figure 1 represents a transversal cross-sectional view looking in the direction 1—1 of Figure 3.
Figure 5 represents a partially broken view, isometrically drawn, in order to show the yoke-shaped members and the two levers comprising the three link structure which is a novel feature on my invention.

To be more explicit with reference to the structural details of my invention, by referring to Figure 1, I provide a general frame structure with conveniently located and suitable crank-shaft bearings designated by the numerals 16 and 18.

The crank-shaft mounted within these bearings, is preferably made of several units in order to facilitate assembly, and by reference to the drawings, it will be seen that the crank-shaft is generally designated by the numeral 45. It is comprised of two parts designated 48 having wrist pin hubs 49, one part designated 51, one portion designated 51', and the crank pins 50.

The portion 48 is provided with an extension designated by the numeral 47 which operates within the bearing 20 of the boss 16. The extension 47 has a further reduced extension designated by the numeral 46 on which either a fly-wheel or transmission unit is mounted.

The member 48 is connected to the member 51 of the crank-shaft thru the crank pin member designated by the numeral 50, the distance from the center of the extension 47 to the center of the crank pin 50 determines the "throw" of the crank-shaft.

The crank portion 51 is provided with an extension 52 which runs in the bearings 21 of the boss 18, and has a further reduced extension designated by the numeral 53 which is provided with a tapered end 54 terminating in a threaded shank portion designated by the numeral 55. The purpose of this structure will become apparent instantly.

Into the bearing 18 is driven a bushing designated by the numeral 22 which has a suitable shoulder 24 for resting on the inner surface of the frame support 15 heretofore mentioned, and has a tapered opening therein designated by the numeral 23 which is to fit the taper 54 of the crank-shaft extension designated 53, in order to take up any end thrust or wear.

The crank-shaft 45 is further comprised of two portions, one designated 48, and one designated 51' connected by a crank-pin 50. The portion 48 has an extension 47 to operate in a journal 20 also having a reduced extension 57 on which is mounted suitable power transmission means for connection to a unit which is to be driven.

The portion 51' is provided with a hole to fit over the threaded shank 55 being secured to the remainder of the crank-shaft structure 45 by means of a suitably threaded nut 56. It can be seen that this crank-shaft arrangement provides a double "throw" crank which is 180° diametrically opposed in its relationship.

The main body 15 is provided with openings 19, wherein the eccentric portions of the crank-shaft 45 operate, thus providing ample clearance therefor. The crank-pins 50 are connected to the pistons 74 in the following manner:

The levers 61 are provided with bosses or hubs 62 adapted to fit rotatably on the crank-pins 50, and on their opposing ends the levers 61 are provided with hubs 63, adapted to fit articulately on pins 69 driven into the side portions 72 of the U shaped portion 71 of the yoke 73. The pins 69 may be held in place by washers 70 and cotter pins not shown. The cylinder castings 29 are recessed as indicated at 28 and 44 in order to furnish clearance for the motion of the yoke assembly 73.

To the pins 69 and adjoining the hubs 63 of the lever 61 are attached rotatably the hubs 60 of the levers 64, the other ends of the levers 64 being suitably drilled at their opposite ends in order to be attached pivotably to the bearings 65 provided on the main casting 15.

The pins 59 are driven into the bearing lugs 65 and work freely in the end 68 of the levers 64. The opposite ends of the yoke members 73 are provided with hubs 73' which are attached swivellably to the wrist pins 90' and 91' of the pistons 74 and 74' respectively.

The toggle action provided by this method of connecting the crank-shaft to the wrist pin of the piston 74 furnishes an ideal means of transmitting power, and tends to relieve the strain on the wrist pin, the yoke 73 taking up the greater portion of the strain.

The compression pistons in the combustion head are designated 74 and those oppositely disposed are designated 74' the latter being provided for the purpose of pumping the fuel mixture received by suction thru the intake port 106 and passing it along thru the pipe line 102 to the pre-compression chamber 128.

The pistons 74 and 74' within each cylinder are equipped with piston rings 85 and are connected by levers 78 having hubs 77 adapted to fit rotatably on wrist pins 90' and 91' thus serving to hold together the pistons 74 and 74' so that motion is imparted to them simultaneously when combustion takes place, the reciprocating motion of the pistons tending to rotate the crank 45.

The pistons 74 and 74' are retained or confined within the cylinders designated generally by the numeral 29. These cylinders are provided with suitable fuel feed connecting means designated by the numeral 30 to which is attached the pipe line 31 the purpose of which will be hereinafter explained.

Figure 2:
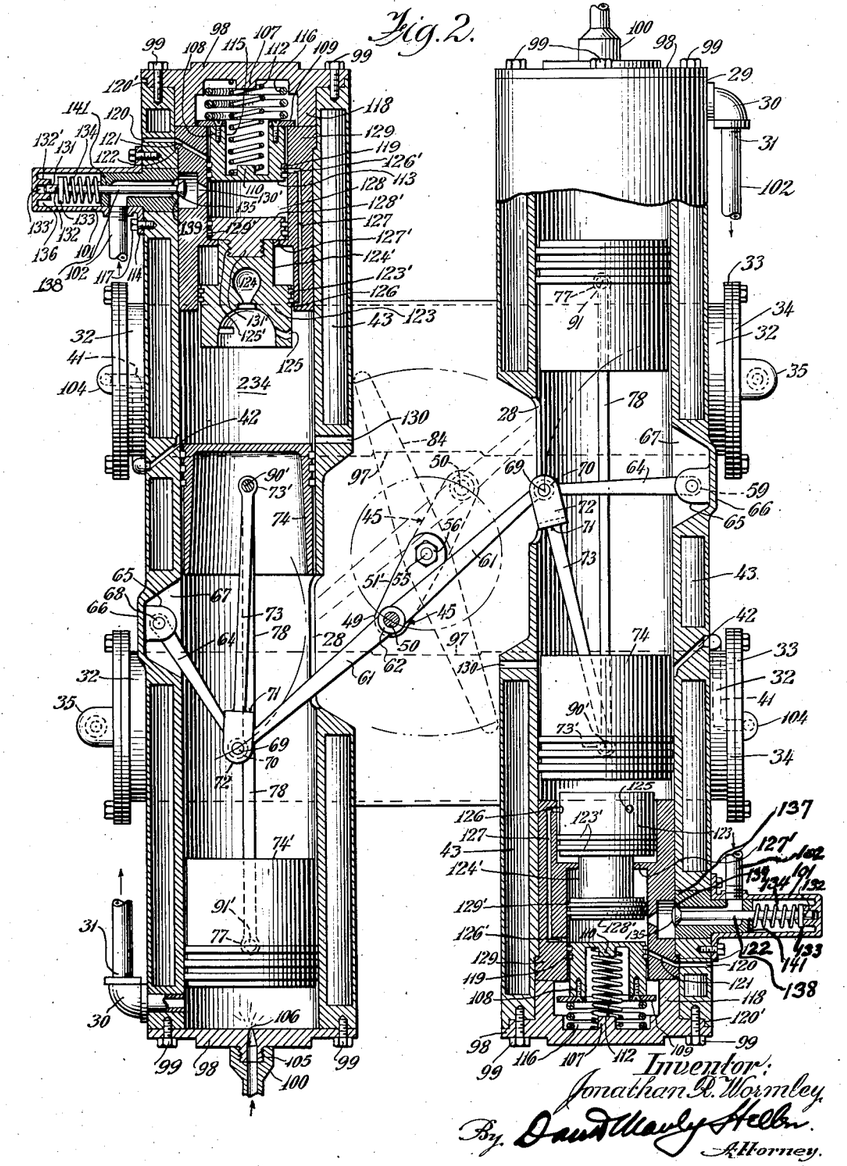
Figure 2 represents a longitudinal cross-sectional view on the line 2—2 of Figure 1.

Each of the cylinders 29, there being four in this particular instance, house respectively two sets of pistons namely 74 and 74' and this can readily be noticed by reference to the illustration shown in Figure 2. The pistons of each cylinder are diametrically opposed and are connected to one another by virtue of the link designated by the numeral 77 heretofore mentioned and described.

The bearing 65 is housed within a recessed extension or extended portion designated by the numeral 66, which is integral with the casting of the cylinders 29 providing clearance space 67 and is supported by the web 17 of the casting 15.

The piston members 74 and 74' in each cylinder are provided with boss portions 75 and 76, which are so disposed as to permit connecting the two pistons 74 and 74' in any one cylinder, in an offset or off center position in order that the levers 78 will be clear of the motion of the levers 61 heretofore mentioned and described.

The web structure designated by the numeral 17 on the main casting 15, tends to tie together rigidly the sides of the framework 15 with the central crank-shaft support bearings 18 and also provides suitable recesses for holding firmly in place the cylinders 29. If it should be desirable, the cylinders 29 may be cast integral with the frame 15.

Figure 4:
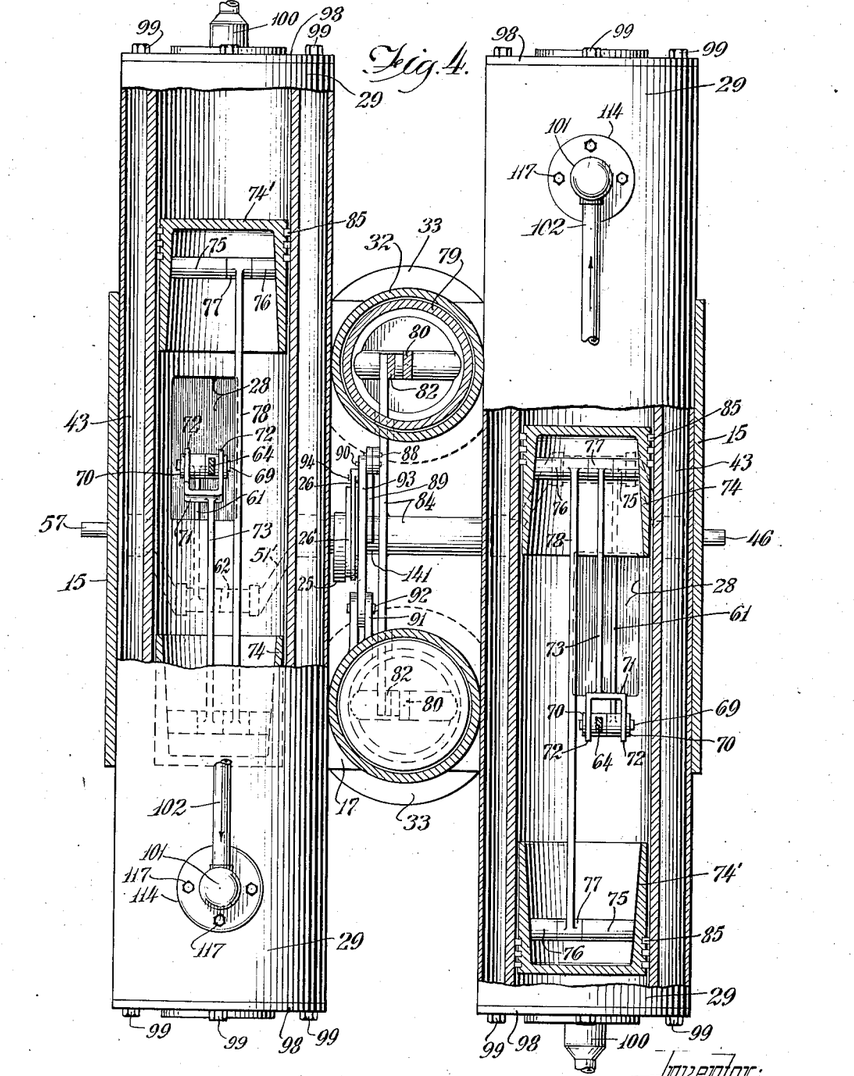
Figure 4 represents a longitudinal cross-sectional view on the line 4—4 of Figure 1.

The scavenging pump cylinders designated by the numeral 32 are preferably placed transversally in relation to the four cylinders designated by the numerals 29, and are spaced suitably from above and below the crank-shaft, relatively as shown in Figure 4; one on either side of the crank-shaft motivating means 45, which arrangement provides a compact and rigid structure for tieing up rigidly all cylinders in their proper relationship.

The two transversally located pump cylinders 32 are used primarily for scavenging, and require very little power for operation. These pumps are comprised of body cylinder portions 32 having flange extensions at each end designated by the numeral 33. Upon these flange extensions are mounted suitable flanges designated by the numeral 34 which are constructed to be configurative with the flange portion 33 and attached at the machined surfaces 39 and 40. These flange members are provided with intake valves to draw in air to be forced thru the ports 41 and 42 and to clear or scavenge the chambers 234 forcing out the burnt gases thru exhaust ports 130.

Here I wish to point out that the port 42 is directed upwardly in order to shoot the air toward the top of the combustion chamber and thus effectively scavenge the burnt gases.

These air intake valves of the scavenging cylinders 32 are housed within an extension of a semi-circular shape designated by the numeral 35 having a recessed portion in which operates the stem 38 of the intake valve, and which is suitably enlarged and tapered at the head in order to seat and seal firmly against the seat 36'.

The extension 38 is suitably threaded at the end and provides a means of attachment for the threaded washer or nut designated by the numeral 36, which confines the spring element designated by the numeral 37. The spring has a tendency to keep the valve 38 normally closed, but when air is drawn in, or suction takes place by means of the pump piston 79, this spring member 37 is depressed allowing the air to pass thru the valve and into the inner chamber of the cylinder 32.

The air of this cylinder is drawn in by the vacuum created by the movement of the piston 79 in one direction and is supplied to the engine for scavenging purposes as heretofore mentioned by movement in the opposite direction. The pistons 79 are equipped with suitable piston rings 86 and have boss extensions adapted to receive wrist pins 81 by virtue of which they are connected to one another to work in unison, being so connected by the levers designated by the numeral 80. The scavenging pumps pass the air thru an opening designated by the numeral 41 in the boss 104 of the flange 34 and thru the bent passage 42 into the piston chambers 234 of the cylinders designated 29.

The operation of these pistons 79 is brought about by an eccentric lever designated by the numeral 26 which has a circular ring extension designated by the numeral 26' and which is housed within a suitable bearing surface 96 on the eccentric designated by the numeral 95. This eccentric 95 has a weighted extension designated by the numeral 25 which is for the purpose of counter balancing the action of the eccentric lever 26 and its cooperating eccentric 95 in order not to interfere with the smooth running of the crank-shaft, made possible by the toggle arrangement heretofore described.

By reference to Figure 2 the structure of the individual pre-compression and combustion chambers of the respective cylinders 29 can be seen in greater detail.

In Figure 2, I show the structure of the combustion and the pre-compression chambers wherein it can be seen that the cylinders 29 are provided with suitable water cooling jackets or spaces 43 for cooling the cylinders.

All the pistons are provided with a suitable number of compression and sealing piston rings in accordance with the conventional practice. The piston 74 operates within the inner chamber 234 of the cylinder 29 and is connected to the crank-shaft by means of the lever 61 heretofore mentioned.

The top portion of the cylinder 29 is sealed by a flange member designated by the numeral 98 and is held in place with screws or other suitable means designated by the numeral 99.

The flange 98 is provided with an extended annular portion designated by the numeral 118 which fits securely into a recess provided for same at the top of the cylinder and has a further shoulder portion designated by the numeral 120' in order to seal the said flange against the top portion of cylinder securely and prevent any possible leakage.

The central portion of the flange is provided with an inner projection designated by the numeral 107, which locates the spring member 112 in position at one end, the said spring member 112 being located at its other end by a similar projection designated by the numeral 110, provided on the piston designated 113.

The piston 113 is of conventional form and is provided with suitable piston rings designated by the numeral 119 in order to prevent leakage and provide a satisfactory seal. The said piston is provided with a cover plate designated by the numeral 109 secured to the piston by the screw member designated by the numeral 108.

This cover plate provides an extension or shoulder, so that the piston in its normal position when the springs 116 and 112 are extended, will tend to hold it up against the sleeve member designated by the numeral 129.

This sleeve 129 has a slight undercut designated by the numeral 122, in order to position it suitably within the cylinder proper. The sleeve 129 is also provided with a port designated by the numeral 126' which leads into a by-pass 127, and ultimately to another port opening designated by the numeral 126 the function of which will hereinafter be described.

The said sleeve 129 is also provided with a safety exhaust port designated by the numeral 121, directly connected to, and leading into the port 120 in the main cylinder body. The gas mixture is pumped into the pre-compression chamber designated by the numeral 128, then the lead pipe 102 which in turn opens the valve 135, and is forced thru a reduced or conically shaped nozzle designated by the numeral 130', and which has a tendency to thoroughly mix the air and gas mixture simultaneously with the feeding into the pre-compression chamber.

It is also to be noted that the sleeve member 129 is provided with a shoulder designated by the numeral 127' provided for the purpose of supporting the combination structure, comprised of a small piston designated by the numeral 128' secured to an auxiliary piston structure designated by the numeral 123.

The piston 128' as can be seen is provided with suitable piston rings 129' and a threaded shank extension designated by the numeral 131' and this extension 131' threads into the threaded recess portion 125' provided in the said piston 123.

The piston 123 is also provided with suitable piston rings 123' for purposes heretofore mentioned, namely for providing a satisfactory seal within the cavity where the piston operates until such time as the proper ports are aligned to definitely determine the path of the gases from the pre-compression chamber to the combustion chamber.

It is also to be noted that piston 123 has a reduced portion designated by the numeral 124' which works within the recess provided by the shoulder portion 127'. The piston 128' seats against the shoulder 127' when the pre-compression chamber is being charged.

It will also be noted that the piston 123 is provided with a series of ports designated by the numeral 125, which are bent upwardly in order to lead the gases coming thru the port 126 upwardly, and into the pear shaped opening designated 124 producing turbulence and agitation of the air and gas mixture prior to ultimate combustion.

To prevent the mixture of the air and fuel in the pre-compression chamber from reaching a degree of compression, where combustion would become imminent, the ultimate compression of spring 116 thus causes the piston 113 to open the safety exhaust ports 120 and 121, causing the pre-compression mixture to be lowered in pressure to the proper degree. This situation is not apt to arise often, yet when it does, the safety valve structure just described will relieve such a condition. The piston 113 is equipped with piston rings 119.

When the mixture is suitably pre-compressed, and the piston 123 is moved upward, the ports 125 in the piston 123 register with the annular groove 126, connecting the combustion chamber 234, with the pre-compression chamber 128, thru the by-pass 127. This permits the mixture to pass into the combustion chamber 234 where final compression by the piston 74 takes place. The final compression reaching the point where combustion takes place, drives the piston 74 downward, to provide the power stroke for the incidental rotation of the crank-shaft 45.

The mixture of air and fuel is passed into the pre-compression chamber thru a valve, which is arranged at the end of the pipe line 102, and adapted to fit securely thereto. The frame or cylinder 29 has an extension designated by the numeral 137 on which is mounted a housing or cover designated by the numeral 101. The recess 136 within this cover provides ample space for mounting the valve stem 131 provided with a washer and cotter pin construction designated at 133 and 132 which help to confine the spring designated by the numeral 134.

The valve housing designated by the numeral 101 is provided with a flange portion designated by the numeral 114 to adapt it to be secured to the main body or cylinder casting, it being held in place by the screws designated by the numeral 117. The housing 101 is also provided with an inner hub extension designated by the numeral 132' having a bearing or guideway 133' in order to guide the end of the valve stem designated by the numeral 131.

The valve stem 131 terminates in a tapered head 135 which functions against a seat designated by the numeral 139. The portion 137 of the cylinder 29 is provided with a bearing 141 which suitably guides the stem 138 in its movement. The normal tendency of the valve head 135 is to seal the seat designated by 139.

When the mixture of fuel is forced or pumped into the pre-compression chamber, the movement of the valve stem 131 causes the seal at the point 139 to be broken thus opening the passage 140. The mixture is disposed thus to travel thru the opening 126 and 127 and force the piston surface 113 towards compressing the spring member 116 and 112 heretofore described.

When this action takes place, the piston 123 will move in an upward direction thus aligning the port 126 with the port 125, heretofore mentioned, which allows the mixture to enter the combustion chamber designated by the numeral 234. The piston 123 is provided with a "pear" shaped recess designated by the numeral 124 which is for the purpose of turbulating and agitating the gaseous mixture in order to provide a more thorough mixture for combustion, and which provides a smoother action relieving shock.

When combustion takes place as can be seen in the lower right hand corner of Figure 2, the piston 74 is forced upward which in turn carries the opposing or fuel feeding piston designated 74' in an upward direction causing it to charge the pre-compression chamber. The fuel feeding piston designated 74' receives a mixture of gas and air thru the restricted orifice 106 which has a tendency to cause the fuel to be atomized in the form of a vapor or spray, the piston 74' thus traveling down to convey the mixture so formed thru the piping designated at 30 and 31 and thru the upper valve structure 135 into the pre-compression chamber heretofore described and designated 128.

Figure 3:
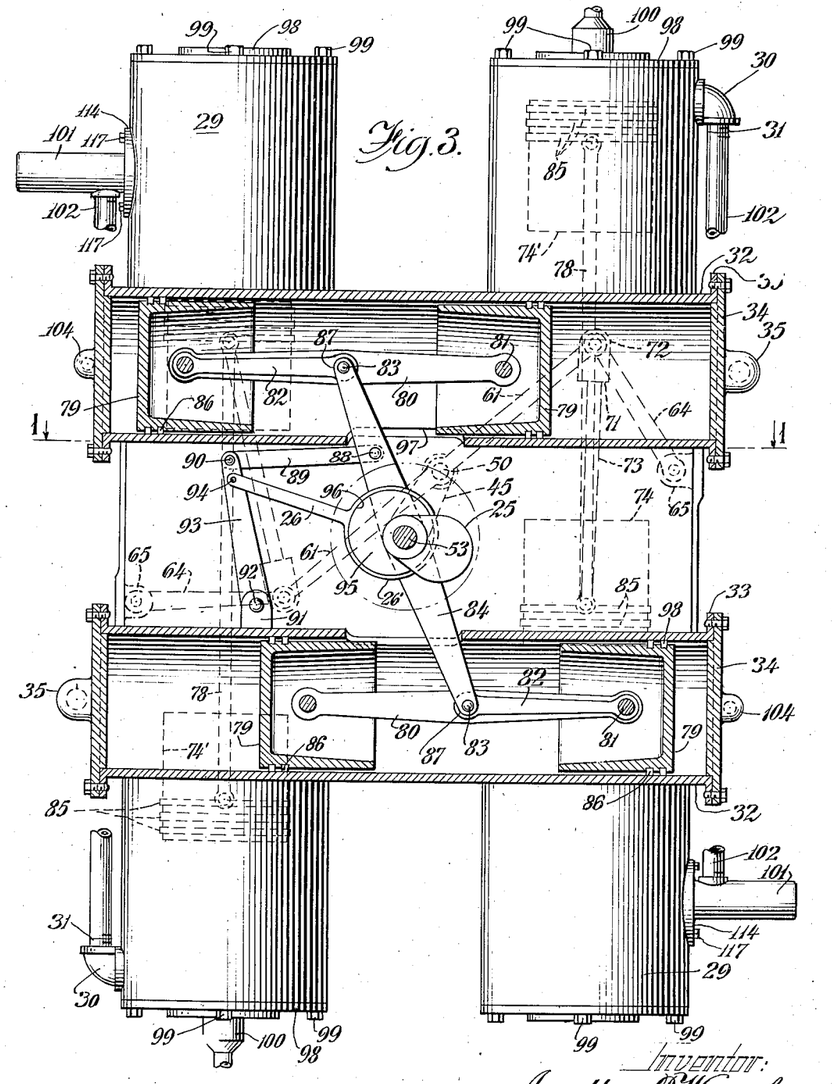
Figure 3 represents a longitudinal cross-sectional view on the line 3—3 of Figure 1.

In Figure 3, I illustrate more clearly the method of operating the pistons 79 within the scavenging cylinders designated by the numeral 32. These cylinders comprise circular body portions designated by the numeral 32 having flange extensions for suitably attaching to the flange member 33 and having bosses 35 and 104 respectively. The portion 35 provides a housing 35' for the air intake valve heretofore described, the drilled portion 130 being the exhaust ports which line up with the scavenging ports 41 and 42 shown in the cylinders 29.

This scavenging arrangement assures a positive exhaust of the impure gases resulting from combustion, thus providing a clean combustion chamber which tends to increase the output and efficiency as well as the mechanical advantage of the engine design that I have provided.

The pistons designated by the numeral 79 are conventional in form, having wrist pin connections designated by the numeral 81. On the wrist pin of one of the pistons 79 is connected an auxiliary link member designated by the numeral 82, and on the diagonally opposed piston in the other cylinder, another similar auxiliary link member designated by the numeral 82 is attached. These two auxiliary lever members designated by 82 are connected at their opposite ends to a lever designated by the numeral 84 which oscillates right and left by virtue of its hub extension 27 into which is secured the bushing 58 (Figure 3) which lever moves each individual assembly of the pistons 79 in their respective cylinders, moving them alternately and reciprocally as shown on the drawings.

The cylinders 32 have a cut out portion 97 providing clearance for the oscillating movement of the lever 84. The oscillating lever 84 is provided with two reduced end extensions designated by the numeral 87, and is articulately secured to the links 82 by virtue of the hinge pins indicated by the numeral 83. The lever 84 is moved or oscillated by virtue of the lever 89 which is pivotally connected to the aforesaid lever 84 by virtue of a hinge pin designated by the numeral 88.

The lever 89 is secured articulately by virtue of a hinge pin 90 to a lever designated by the numeral 93, the lever 93 in turn is pivoted by virtue of a pin 92, on the bearing designated by the numeral 91. This bearing 91 is part of the framework 15. To the lever 93 at the point 94 is secured the eccentric crank designated by the numeral 26 by virtue of a pin designated by the numeral 94. This crank has a round hoop-like portion, designated by the numeral 26' and is secured to the eccentric designated by the numeral 95 thru a slotted groove 96 cut in this eccentric 95.

In Figure 4, is shown more elaborately and in detail the connection of the yoke members heretofore designated 73 with respect to the pumping pistons 74' and final compression pistons 74 operating within the cylinders 29; also a longitudinal cross-sectional view along the lines 4—4 of Figure 1, showing the pumping cylinders used for scavenging the combustion chambers 234.

Figure 6:
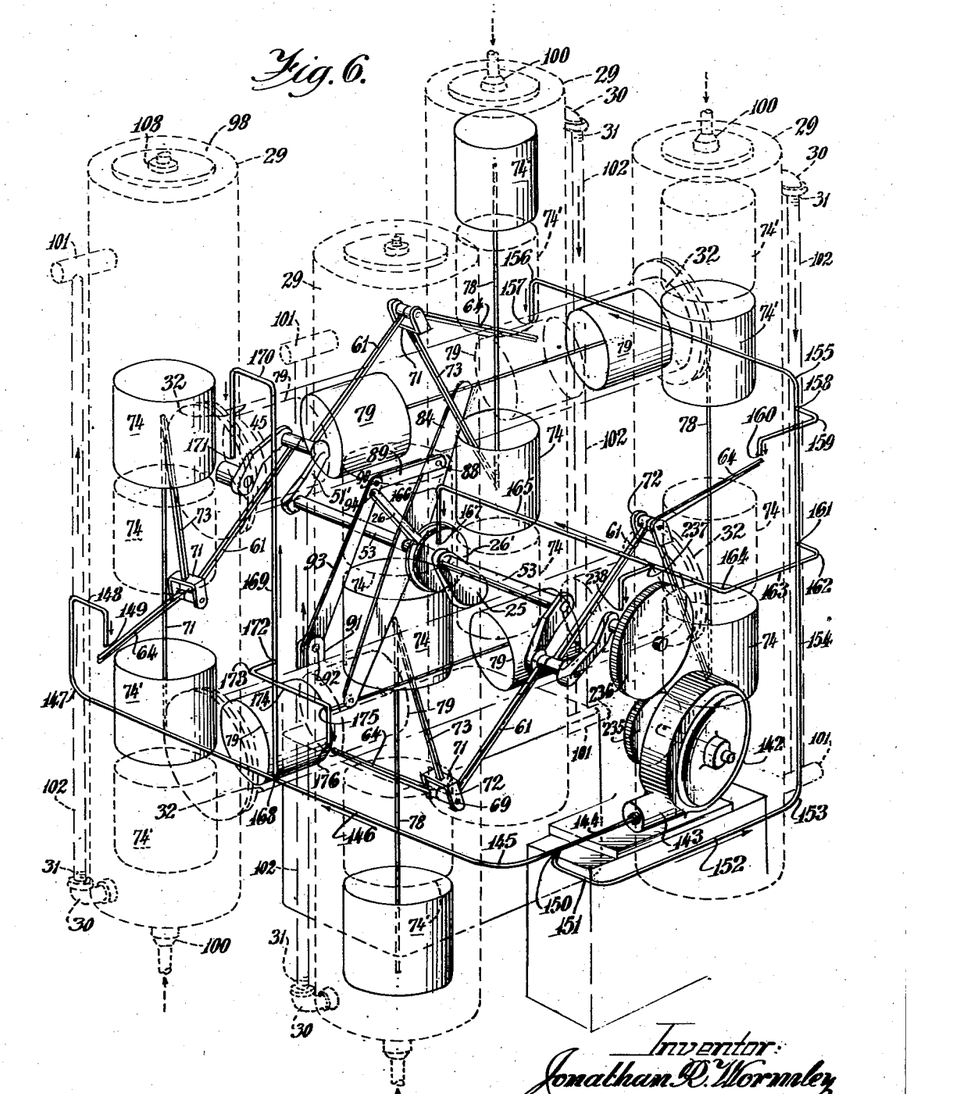
Figure 6 represents a schematic diagram showing the engine in perspective and in phantom, also showing in solid lines the oil pump and oiling system to the various points of the engine such as the crank-shaft bearings and the connecting rod bearings.

In Figure 6, I illustrate in perspective and in phantom lines, the general appearance of my engine structure, and its most vital component elements. This view is submitted for the purpose of showing schematically the general arrangement of an oil pumping system that may be incorporated in my Diesel engine design.

As can be seen by reference to the drawings, the oil pump is generally designated by the numeral 142 which is driven by suitable gearing 235 and 236 attached to one end of the crank-shaft. The oil is pumped thru the ejecting portion of the pump designated by the numeral 143, into the initial outlet designated by the numeral 144, which is a piece of piping having suitable bends designated 145, and another straight portion designated 146, a bend 147 which continues for a short distance, then terminating in a U-shaped bend designated by the numeral 148, which furnishes proper lubrication for the lever designated by the numeral 64 at a point designated 149.

At 150 the oil pipe 144 branches off to the portion 152, is bent at 151 and 153, continuing in a straight portion 153, bent at 155, a straight portion terminating in another bend 156, terminating at the point 157, and supplying lubrication to the opposing pivoted lever designated 64.

At a point 168 there is a riser designated 169 terminating in a U-shaped bend designated by 170, and at the point 171 provides lubrication for the bearing designated 16 on the drawings. The opposite side has a similar arrangement taken from the extension 154 which is provided with a juncture of piping at the point 161, bent at 162, continuing with a straight portion designated 163, a further bend 164, an extension 165, and a further bend 166 terminating at the point 167, which offers suitable lubrication to the eccentric 95 and the eccentric lever 26. From this pipe connection 165 at a point 237, a bent portion is provided at the point 238, which provides lubrication for the other bearings designated by the numeral 16.

The oil piping system further provides at a point 158 joined to pipe line 154, a pipe bent at 159 and terminating at a point 160 in order to provide lubrication for the rod 64 pivoted on the cylinder bearing 65. The pipe line 169 at the point 172 provides a juncture for a pipe line bent at 173 continuing in a straight line 174, bent at 175 and terminating at 176, providing lubrication for the other bearing 65 of the pivoted toggle lever designated by the numeral 64.

The arrangement as shown in this drawing is merely suggestive and may be modified depending on the nature of the lubricant or lubrication to be used in connection with my type of Diesel engine.

Figure 7:
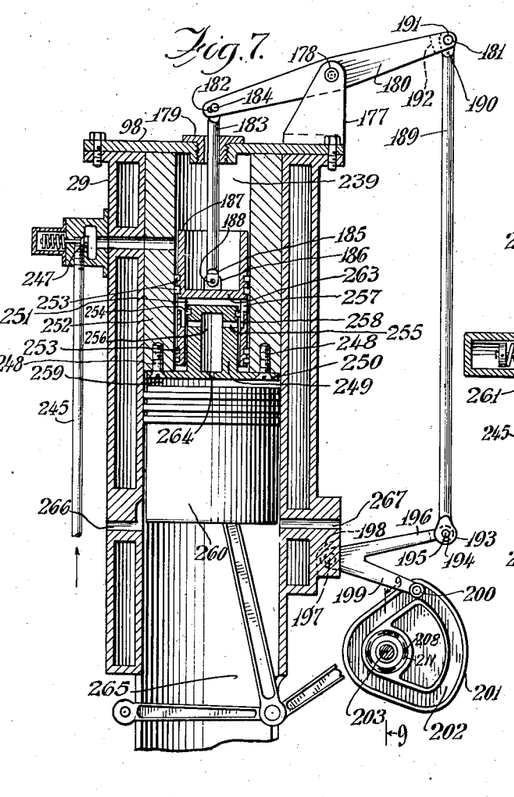
In Figure 7 I show in cross-section a modification of the pre-compression head, wherein the pre-compression mechanism is positively operated by mechanical arrangement.

Figures 7, 8, 9, 10, and 11 show two additional modifications of the pre-compression head of my engine, and the object in Figure 7 is to provide a mechanically motivated positive means of operation, rather than relying on the spring controlled means heretofore expounded on the drawings showing the preferred forms.

In Figure 7, I provide on the top flange member 98 a bearing 177 having a hinge pin designated by the numeral 178, adapted to receive articulately the lever 180. The lever 180 is pivoted at its mid portion on the hinge pin 178 and is provided with a forked extension designated by 192 having rounded ends with a hole designated by the numeral 181. The hole is secured to the hinge pin member designated by the numeral 191 which also secures the connecting rod member by virtue of its flat extension designated 190, in order to articulately attach the rod 189 to the lever 180. The other end of the connecting rod 189 is flattened as designated by the numeral 193 in order to furnish a connecting bearing portion having a hole designated 194 and connected by virtue of a hinge pin 195 to the bell-crank designated by the numeral 196. The bell-crank has an extension 199 terminating in a roller assembly designated by the numeral 200.

The angular lever having arms 196 and 199 is hinged to a pin member designated by the numeral 197, which is attached to a slot in the frame casting of the cylinder 29 and is provided with sufficient clearance as indicated by the dotted line designated 198. This arrangement is similar to the arrangement shown in Figure 2, being provided with a similar inlet valve 247, and with the exception that the pre-compression chamber is operated by the cam actuated means just described.

The left hand extension of the lever 180 has an elongated slot designated by the numeral 182, and this slot fits over the connecting pin 184 which serves to tie up articulately the lever 180 to the rod 183. The rod 183 works in a bushing designated by the numeral 179 threaded into the flange 98. The other end of the rod 183 having bearing portion 185 is suitably connected to bearing portion 186 of the piston designated 187 and held by the hinge pin 188. The piston 187 operates in the chamber 239, is cylindrical in shape, has a central web portion 263, and also a pair of piston rings 253 at top and a pair at the bottom. The portion below the web 263 is recessed as indicated at 257, and recessed downwardly as at 258. The lower hollow portion of the piston 187 designated 251 receives an auxiliary telescopic piston structure 249 which seals the lower portion of the pre-compression chamber when the piston 187 is in an upward position.

The auxiliary piston structure 249 has a piston ring 254 and a flange portion 250 by virtue of which it is secured to the cylinder 252 by screws 248. This auxiliary piston is stationary and is provided with a port 255 leading into a recess 256 and connecting with the combustion chamber inlet 264 where the piston 260 produces final compression and combustion in the chamber 259.

The air and fuel mixture is passed thru the pipe line 245 and admitted thru the valve member 247 into the pre-compression chamber when the piston 187 is in its uppermost position, at which time the ports 255 and 258 do not register thus providing a sealed enclosure or pre-compression chamber.

The ports 266 and 267 are for scavenging the combustion chamber.

The cam 201 operates in such a manner as to cause the web 263 of the piston 187 to compress the mixture against the upper portion of the auxiliary telescoping piston 249, and at the maximum downward stroke of the piston 187, when the ports 258 and 255 are caused to register, the pre-compression mixture will be passed thru the orifice 264 to the combustion chamber 265 where final compression and combustion takes place, completing the cycle.

Figures 9, 11:
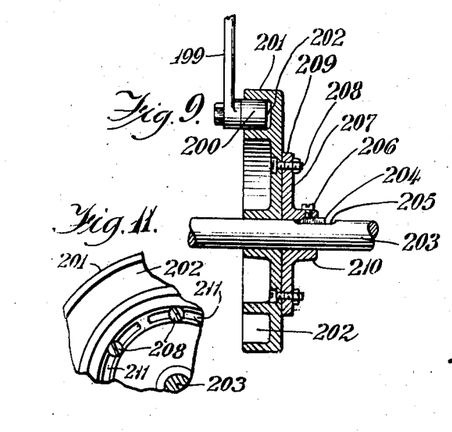
In Figure 9 I show a cross-sectional view on the section line 9—9 of Figure 7 of the cam construction shown in Figure 7 used for operating the positively controlled elements of the pre-compression chamber, the said cam being shown as it is mounted on its respective shaft.
Figure 11 represents a fractionally broken front view of the cam shown in Figure 9, showing the slots therein to aid in positioning the cam accurately on the shaft for proper timing control of the pre-compression chamber.
Figure 10:
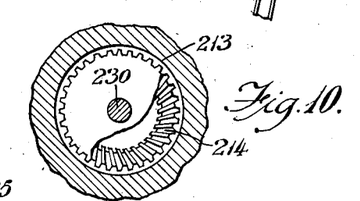
Figure 10 is a view looking in the direction 10—10 indicated on Figure 8.

In Figures 9 and 10 the cam is shown attached to the crank-shaft at a point designated 203 having a track or race 202 which is for the purpose of actuating the piston 187 in order to produce the degree of pre-compression required. For convenience of setting and for accurate timing of this cam, it is preferably made as shown having a body portion 201 and a flange portion designated 209 which is secured thereto by virtue of screws and nuts designated by the numeral 208.

The flange member 209 has a boss designated by the numeral 210 which serves to fasten the cam adapter 207 to the shaft designated by 203. The shaft is suitably slotted for a key as at 205 to receive the key designated 204 which is clamped by the screw 206.

At Figure 11 I show the slotted portions in the cam wherein the bodies of the screws fit for adjustably holding the cam on to the adapter member 209. These slots are arcuately elongated as shown at 211 in order to permit the positioning of the cam to a more precise timing position at assembly when the flywheel of the engine is turned over.

Figure 8:
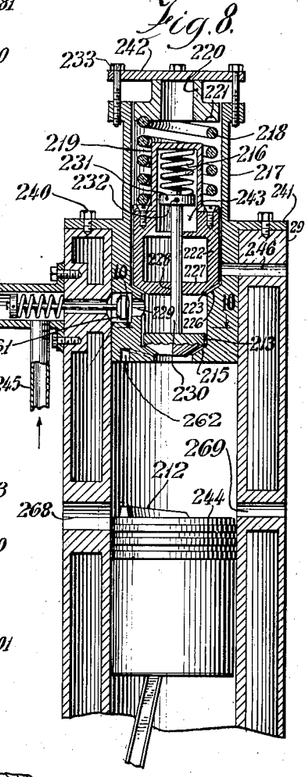
In Figure 8 I show in cross-section a modification of the combustion head showing means for imparting a spinning motion to the fuel mixture in order to more thoroughly mix the air and fuel.

At Figure 8 I show a modified construction of the cylinder head wherein the pre-compression chamber in the body portion designated by the numeral 29 has an extended upper flange portion designated by the numeral 217 being attached to the top of the member 29 by the flange extension 241 and the screws 240.

The pre-compression chamber is arranged so that the extension 217 has secured thereto a top flange 242 held in spaced relationship by the screws 233 and provides a stop for the spring plug designated by the numeral 220. The plug 220 has a recess designated 221 in order to conveniently and suitably locate the spring designated by the numeral 218. This spring member 218 is resting at its other end on the piston member designated by the numeral 222, to which is attached the housing 219.

The housing 219 serves a dual purpose, one as an enclosure for the spring 216, and secondly as an inner drum for supporting the body of the spring 218. The spring 216 is confined in the space 243 of the housing 219 and tends to keep the valve 213 seated against the seat 215. The valve 213 has spiral teeth 214 to cause the fuel mixture passing therethru to be whirled or agitated when the mixture is forced into the combustion chamber for final compression by the piston 244. The piston 244 is provided with an arcuate lip portion 212 which aids in further agitating the mixture during final compression.

The recess 262 is provided as a clearance for the arcuate lip or extension 212 on the piston 244. The ports 268 and 269 are provided as an exhaust for the scavenging action expelling the burnt fuel and the products resulting from combustion. Referring once more to the valve 213, it is provided with a stem 230 having a head washer 231 pinned to the shank 230 by the pin 232, the head 231 being acted upon by the springs 216 and 128 tending to keep the valve 213 in a normally downward position.

The pre-compression chamber is provided with an inlet port 229 connecting with the taper valve inlet 261 which in turn is connected to the inlet fuel pipe 245. The piston 222 has a bevelled face 223 which co-acts with the seat 226 of the member 217.

The safety exhaust port is provided, in order to maintain a degree of compression in the pre-compression chamber which would not be combustible, hence, if a higher compression should be reached than that for which the springs have been set, the piston 222 would be forced upward and allow the excess pressure to be released thru the port 246. The piston portion 227 is drilled with a hole 228 to guide the motion of the valve stem 230.

In this modification it is my intention merely to provide a means of completely and thoroughly agitating the mixture of the fuel and air in the combustion chamber so as to offer a more perfectly combustible mixture, when it is finally injected or passed thru to the combustion chamber, where final compression and explosion or combustion takes place.

When the piston 244 reaches its maximum compression stroke, combustion takes place imparting the necessary power stroke to the piston 244 and operating its mated fuel feeding piston on the opposite end, at the same time imparting motion to the crank 45.

The intake connections 100 connected to the threaded boss 105 of the flanges 98, may be suitably connected by a manifold system and a carburetor not shown in the drawings.

In operation my engine functions as follows; A mixture of air and fuel is drawn in thru a carburetor and manifold (not shown) and thru the orifice 106. Let us assume that the engine is being turned over by crank for starting and the piston 74' is in its uppermost position having sucked in the mixture. When the piston 74' moves downward, the mixture is forced thru a pipe 31 and thru the connection 102 into the pre-compression chamber 128 where pre-compression takes place.

The piston 74 when moved upward will aid the pre-compression by forcing the piston 123 upward until the ports 125 register with the ports 126 when the mixture will pass from the pre-compression chamber to the combustion chamber 234. On continuing its upward stroke, the piston 74 will complete compression ultimately bringing about combustion of the air and fuel mixture thus completing the cycle.

While combustion is taking place in each cylinder 29, suction and pumping by pistons 74' is taking place simultaneously in each cylinder, and inasmuch as alternate cylinders have oppositely arranged or reversed piston structure, the result is a smooth continuous and efficient operation.

The crank-shaft by virtue of the three link toggle system, receives an uninterrupted rotational motion, the toggle arrangement helping to overcome the intermittent break which would ordinarily occur at "dead center" points.

By virtue of the scavenging action of the pumps 32, the efficiency of my novel design engine is materially increased, inasmuch as it affords a clean cavity 234 clear of any foul gases or products of combustion. Improper scavenging would interfere with recurring combustion, and tend to contaminate the clear and clean mixture of gas and air which is drawn in thru the port hole 122, 126, and 125 preparatory to final compression and ultimate combustion.

I believe I have shown in clear and distinct terms and character the general arrangement of parts which are required in presenting the novel principles that I have developed in connection with the type of engine that I have here illustrated.

Although this is a general presentation, showing a preferred form, it is understood that those skilled in the art may make many modifications, alterations, and changes without altering the principle or scope of my invention, and I reserve the right to any and all such modifications, changes, and alterations to which this disclosure may be susceptible, as I feel my disclosure should be limited only by the subjoined claims and the prior art.

Having thus described my invention what I claim as new and desire to secure by Letters Patent is:

1. In a combustion engine, the combination of cylinders, each cylinder provided with a piston structure comprised of two pistons adapted to operate in unison, the said piston structure in any one cylinder arranged in inverted relationship to the piston structure in adjacent cylinders, a fuel pre-compression chamber in each cylinder, and fuel pre-compression means adapted to pre-compress the fuel mixture in said pre-compression chamber, prior to and preparatory for final compression and ultimate combustion.

2. In a combustion engine, the combination of cylinders, each cylinder provided with a piston structure comprised of two pistons adapted to operate in unison, the said piston structure in any one cylinder arranged in inverted relationship to the piston structure in adjacent cylinders, a fuel pre-compression chamber in each cylinder, fuel pre-compression means adapted to pre-compress the fuel mixture in said pre-compression chamber, manifold means connecting the intake ports of each of said cylinders, the said manifold means being connected thru carburetor means to a source of fuel supply.

3. In a combustion engine, the combination of cylinders, each cylinder provided with a piston structure comprised of two pistons adapted to operate in unison, the said piston structure in any one cylinder arranged in inverted relationship to the piston structure in adjacent cylinders, a fuel compression chamber in each cylinder, a fuel pre-compression means adapted to pre-compress the fuel mixture in said pre-compression chamber, manifold means connecting the intake ports of each of said cylinders, a fuel source of supply, and carburetor means intermediately disposed between the said manifold means and the said fuel source of supply.

4. In a combustion engine, the combination of cylinders, each cylinder provided with two pistons adapted to operate in unison, a fuel pre-compression chamber in each cylinder, fuel pre-compression means adapted to pre-compress the fuel mixture in said pre-compression chamber, manifold means connecting the intake ports of each of said cylinders, a fuel source of supply, carburetor means intermediately disposed between the said manifold and the said fuel source of supply, and scavenging means adapted to scavenge the said cylinders after combustion.

5. In a combustion engine, the combination of cylinders, each cylinder provided with two pistons adapted to operate in unison, a fuel pre-compression chamber in each cylinder, fuel pre-compression means adapted to pre-compress the fuel mixture in said pre-compression chamber, manifold means connecting the intake ports of each of said cylinders, a fuel source of supply, carburetor means intermediately disposed between the said manifold means and the said fuel source of supply, scavenging means adapted to scavenge the said cylinders after combustion, a power shaft, and toggle means adapted to connect the said double piston structure to the said power shaft.

6. In a combustion engine, the combination of cylinders, each cylinder provided with a piston structure comprised of two pistons adapted to operate in unison, the said piston structure in any one cylinder arranged in inverted relationship to the piston structure in adjacent cylinders, a fuel pre-compression chamber in each cylinder, spring controlled fuel pre-compression means in each cylinder adapted to pre-compress the fuel mixture in said pre-compression chamber, prior to and preparatory for final compression and ultimate combustion.

7. In a combustion engine, the combination of cylinders, each cylinder provided with two pistons adapted to operate in unison, a fuel pre-compression chamber in each cylinder, cam actuated fuel pre-compression means in each cylinder adapted to pre-compress the fuel mixture in said pre-compression chamber, prior to and preparatory for final compression and ultimate combustion.

8. In a combustion engine, the combination of cylinders, each cylinder provided with a piston structure comprised of two pistons adapted to operate in unison, the said piston structure in any one cylinder arranged in inverted relationship to the piston structure in adjacent cylinders, a fuel pre-compression chamber in each cylinder, spring controlled fuel pre-compression means for each cylinder, adapted to pre-compress the fuel mixture in said pre-compression chamber, manifold means connecting the intake ports of each of said cylinders, a source of fuel supply, the said manifold means connected thru carburetor means to said source of fuel supply.

9. In a combustion engine, the combination of cylinders, each cylinder provided with a piston structure comprised of two pistons adapted to operate in unison, the said piston structure in any one cylinder arranged in inverted relationship to the piston structure in adjacent cylinders, a fuel pre-compression chamber in each cylinder, spring controlled fuel pre-compression means for each cylinder, adapted to pre-compress the fuel mixture in said pre-compression chamber, manifold means connecting the intake ports of each of said cylinders, a source of fuel supply, and carburetor means intermediately disposed between the said manifold means and the said fuel source of supply.

10. In a combustion engine, the combination of cylinders, each cylinder provided with two pistons adapted to operate in unison, a fuel pre-compression chamber in each cylinder, spring controlled fuel pre-compression means for each cylinder, adapted to pre-compress the fuel mixture in said pre-compression chamber, manifold means connecting the intake ports of each of said cylinders, a source of fuel supply, carburetor means intermediately disposed between the said manifold means and the said fuel source of supply, and scavenging means adapted to scavenge the said cylinders after combustion.

11. In a combustion engine, the combination of cylinders, each cylinder provided with two pistons adapted to operate in unison, a fuel pre-compression chamber in each cylinder, spring controlled fuel pre-compression means for each cylinder, adapted to pre-compress the fuel mixture in said pre-compression chamber, manifold means connecting the intake ports of each cylinder, a source of fuel supply, carburetor means intermediately disposed between the said manifold means and the said source of fuel supply, scavenging means adapted to scavenge the said cylinders after combustion, a power shaft, and toggle means adapted to connect the said double piston structure to the said power shaft.

12. In a combustion engine, the combination of cylinders, each cylinder provided with two pistons adapted to operate in unison, a fuel pre-compression chamber in each cylinder, cam actuated fuel pre-compression means for each cylinder, adapted to pre-compress the fuel mixture in said pre-compression chamber, manifold means connecting the intake ports of each of said cylinders, the said manifold means connected thru carburetor means to a source of fuel supply.

13. In a combustion engine, the combination of cylinders, each cylinder provided with two pistons adapted to operate in unison, a fuel pre-compression chamber in each cylinder, cam actuated fuel pre-compression means for each cylinder, adapted to pre-compress the fuel mixture in said pre-compression chamber, manifold means connecting the intake ports of each of said cylinders, a source of fuel supply, and carburetor means intermediately disposed between the said manifold means and the said source of fuel supply.

14. In a combustion engine, the combination of cylinders, each cylinder provided with two pistons adapted to operate in unison, a fuel pre-compression chamber in each cylinder, cam actuated fuel pre-compression means for each cylinder, adapted to pre-compress the fuel mixture in said pre-compression chamber, manifold means connecting the intake ports of each of said cylinders, a source of fuel supply, carburetor means intermediately disposed between the said manifold means and the said source of fuel supply, and scavenging means adapted to scavenge the said cylinders after combustion.

15. In a combustion engine, the combination of cylinders, each cylinder provided with two pistons adapted to operate in unison, a fuel pre-compression chamber in each cylinder, cam actuated fuel pre-compression means for each cylinder, adapted to pre-compress the fuel mixture in said pre-compression chamber, manifold means connecting the intake ports of each of said cylinders, a source of fuel supply, carburetor means intermediately disposed between the said manifold means and the said source of fuel supply, scavenging means adapted to scavenge the said cylinders after combustion, a power shaft, and toggle means adapted to connect the said double piston structure to the said power shaft.

16. In a combustion engine, the combination of cylinders, each cylinder provided with a piston structure comprised of two pistons adapted to operate in unison, the said piston structure in any one cylinder arranged in inverted relationship to the piston structure in adjacent cylinders, a fuel pre-compression chamber in each cylinder, fuel pre-compression means adapted to pre-compress the fuel mixture in said pre-compression chamber, and fuel mixture agitating means for thoroughly mixing the air and fuel comprising the fuel mixture, prior to and preparatory for final compression and ultimate combustion.

17. A combustion engine comprising, four cylinders, each cylinder provided with a piston structure comprised of two pistons adapted to operate in unison, the said piston structure in any one cylinder arranged in inverted relationship to the piston structure in adjacent cylinders, a fuel pre-compression chamber in each cylinder, and fuel pre-compression means adapted to pre-compress the fuel mixture in said pre-compression chamber, prior to and preparatory for final compression and ultimate combustion.

18. A combustion engine comprising, four cylinders, each cylinder provided with two pistons adapted to operate in unison, a fuel pre-compression chamber in each cylinder, fuel pre-compression means adapted to pre-compress the fuel mixture in said pre-compression chamber, manifold means connecting the intake ports of each of said cylinders, a fuel source of supply, carburetor means intermediately disposed between the said manifold means and the said fuel source of supply, scavenging means adapted to scavenge the said cylinders after combustion, a power shaft, and toggle means adapted to connect the said double piston structure to the said power shaft.

19. A combustion engine comprising, four combustion cylinders, each cylinder provided with two pistons adapted to operate in unison, a fuel pre-compression chamber in each combustion cylinder, fuel pre-compression means adapted to pre-compress the fuel mixture in said pre-compression chambers, manifold means connecting the intake ports of each of said combustion cylinders, a fuel source of supply, carburetor means intermediately disposed between the said manifold and the said fuel source of supply, scavenging means comprising two air pumping cylinders, each air pumping cylinder connected to two alternately disposed combustion cylinders, a power shaft, toggle means adapted to connect the said power shaft, and eccentrically mounted link means adapted to operate the said pumping cylinders, the said link means connecting the pumping cylinders to the power shaft.

20. In a combustion engine, a cylinder structure comprising two pistons adapted to operate in unison, a fuel pre-compression chamber adjacent to a combustion chamber within the cylinder, spring controlled piston valve means disposed so as to permit the transfer of a fuel charge from the said pre-compression chamber directly to the said combustion chamber, and fuel turbulating means interposed between the said fuel pre-compression means and the said combustion chamber.

JONATHAN R. WORMLEY.